Sept. 26, 1950        H. L. GATES        2,523,822
SELF-COMPENSATING MECHANICAL POWER TRANSMISSION
Filed Sept. 27, 1948
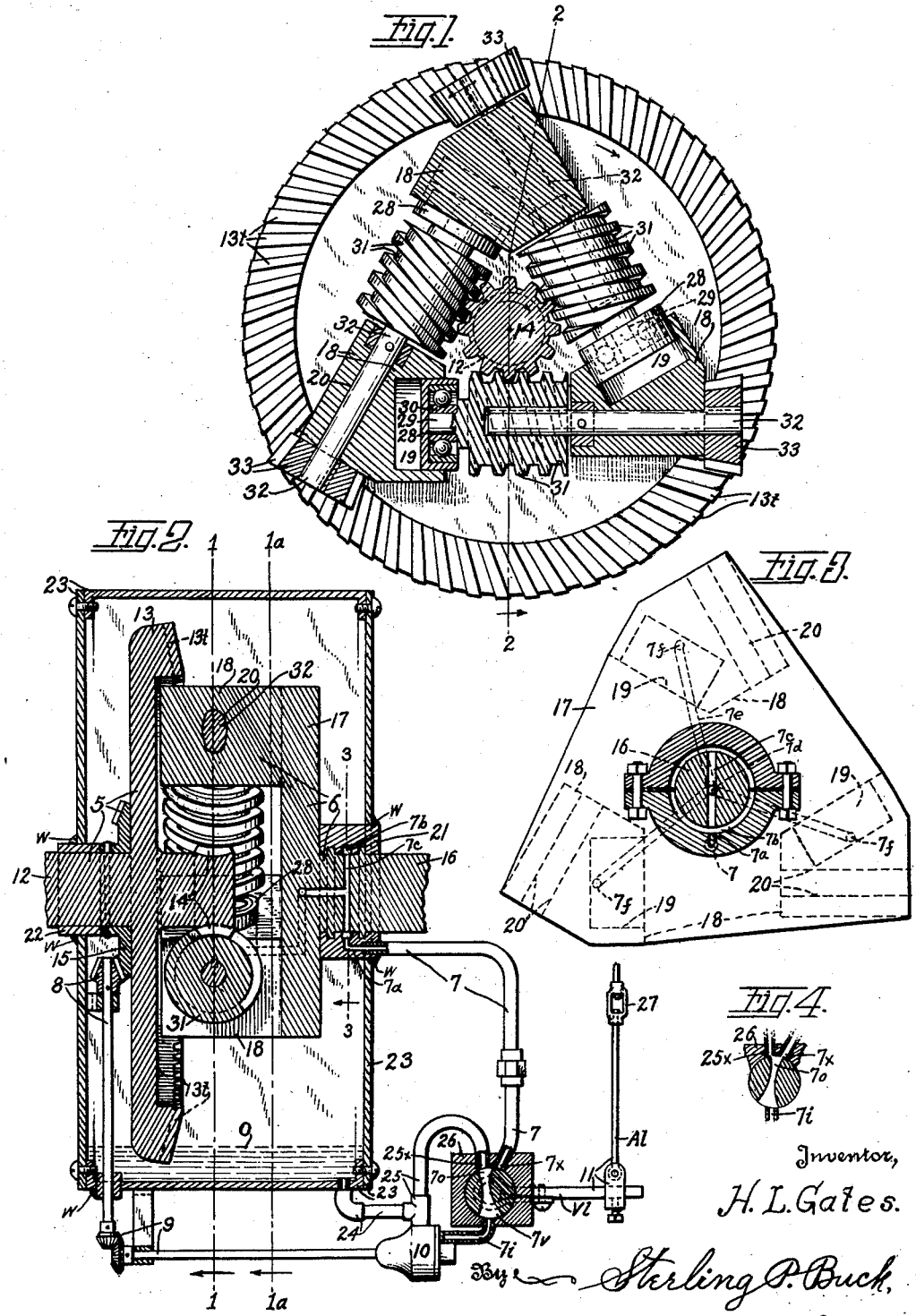
Inventor,
H. L. Gates.
By Sterling P. Buck,
Attorney.

Patented Sept. 26, 1950

2,523,822

UNITED STATES PATENT OFFICE 2,523,822

SELF-COMPENSATING MECHANICAL POWER TRANSMISSION

Howard L. Gates, Baltimore, Md.

Application September 27, 1948, Serial No. 51,463

9 Claims. (Cl. 74—750)

This invention relates to machine elements, especially to a transmission gear mechanism and hydraulic device combined for reciprocal actuation and control, to which I apply the abbreviated title Self-Compensating Mechanical Power Transmission.

The primary object of this invention is to provide a transmission mechanism which automatically adjusts the speed of the driving unit according to the variations in speed and load or inertia of the driven unit, and compensates for quick changes in speeds or loads moved thereby, to avoid strain in the elements thereof, to avoid shocks or jerks in the load being moved thereby, and also to avoid stalling of the prime mover due to excessive loads.

Another object is to provide a transmission mechanism in which a sudden change of speed of the driving unit results in a gradual change in speed of the driven unit.

Other objects and important features are pointed out or implied in the following details on description, in connection with the accompanying drawings in which:

Fig. 1 is a partly sectioned view on line 1—1 of Fig. 2 and partly in section on line 1a—1a of Fig. 2, the curved arrows showing the direction of rotation of the driving unit, and the straight arrow showing the direction of movement of the upper pinion of the driven unit.

Fig. 2 is a sectional view of the combination, the section being taken on line 2—2, Fig. 1.

Fig. 3 is a sectional view taken on line 3—3, Fig. 2.

Fig. 4 is a fragmental view showing the control valve in a different position from that shown in Fig. 2.

Referring to these drawings in detail, in which similar reference characters represent similar parts throughout the several views, the invention is described and explained as follows:

Briefly, the invention comprises a driving unit 5, a driven unit 6, a hydraulic pressure conduit that comprises elements 7, 7a, 7b, 7c, 7d, 7e, 7f; and further comprises a pressure producing means 8, 9, 10; and a pressure regulating means 11; all combined in a proper relation to obtain the foregoing objects.

The integral driving unit includes a driving shaft 12 adapted to be operatively connected to any appropriate power-source (not shown), a large hypoid bevel gear-wheel or ring-gear 13, and a small worm-gear-wheel 14. The teeth of the gear wheel 13 are preferably beveled and disposed tangentially to a theoretical circle within and parallel to the rim carrying the teeth. A bevel-gear 15 is united with the driving shaft 12 and is operatively connected with the pump 10 through the medium of transmission elements 8 and 9 and bearings therefor.

The integral driven unit 6 comprises a driven shaft 16, a block or plate 17, and one or more eccentrically disposed and tangentially bored elements 18. Though three of these elements are shown, for sake of balance and durability, a single one would suffice for operation as described hereinafter; so only one is here described, and it is integral with the block 17 and has a piston socket 19; its bore or axle bearing being shown at 20. The driven axle 16 is axially alined with the driving axle 12, and these axles are journaled in bearings 21 and 22, respectively, here shown as welded at $w$ to the bearing frame or gear case 23. The bearing 21 has therein an aperture 7a that forms part of the pressure-applying conduit which is in open communication with conduit-elements 7, 7b, and 7c, and therethrough in open communication with conduit-elements 7d, 7e, and 7f, thence in open communication with the piston socket 19 (all seen in Fig. 3).

The lower part of the gear-case 23 is an oil container, and lubricating oil is indicated therein at O. It is seen that the lower edge of the ring gear wheel 13 is immersed therein, so, when it rotates, it carries oil up to flow down on all the bearings and rotary elements in the gear-case and keeps them lubricated. The oil O can be drawn to the pressure-supplying pump 10 through a feed pipe 24 that is in open communication with pipe 25 which is in open communication with the pump 10 and with the valve body 26 at a point so near to the pipe end 7x that the outlet end of the valve-port can be in open communication with the pipe ends 7x and 25x at the same time, when the valve is adjusted as in Fig. 4; these adjustments are made at the will of the user who operates the valve-lever V1 by means of the accelerator link A1 by any appropriate means (not shown).

Though this transmission-mechanism is applicable and useful in various mechanisms and machines, it appears only necessary to explain it in connection with a motor-vehicle having an accelerator to which the link A1 is appropriately connected and adjusted by a turnbuckle 27. The gear-case 23 and valve body 26 can be secured to the motor vehicle by any appropriate means (not shown) and in any appropriate position; and the drive shaft 12 may be the vehicle-motor-shaft or be connected to it; while the driven shaft may be connected to appropriate reverse or reduction gears for driving the vehicle. When thus or similarly installed for use, we may assume that we are starting the machine for the first time, all of the elements then being in their positions shown in Fig. 2, viz., the bypass (24—25x) then being fully open thru the valve-opening 7o, while the pressure-applying conduit-element 7 is fully closed and there then being no pressure-fluid in the cylinders 19; and assuming there is a load attached to the driven shaft 16 so as to resist its rotation; also assuming that a prime-mover is attached to the driving shaft 12 for causing the latter to rotate; the starting and operating procedure is as follows:

When the prime-mover is started, the elements 12, 13, 14, 15, 8 and 9 begin to rotate, thereby to operate the pump 10 so as to merely circulate oil, from the reservoir 0, thru the bypass 25—25x and valve-opening 7o; and during this moment of starting, the load and inertia on the driven shaft 16 keeps the elements 16, 18 and 19 momentarily stationary while elements 13t, 33, 32 and 31 rotate or move circumferentially and cooperate with the worm-gear wheel 14 for moving the pistons deeper into the then-empty cylinders 19; for cooperation of the rotating worms 31 with the teeth of the relatively stable worm-gear-wheel 14 causes the worms to slide along their axles and to push the pistons 28 into the cylinders or pressure-chambers 19 until they meet the closed ends of the cylinders, or meet oil that may have been admitted by the operator shifting the valve-opening 7o to its position in Fig. 4. In this shifted position of the valve-opening, the hydraulic fluid or oil is admitted and pumped thru the conduit-elements 7, 7a, 7c, 7d, 7e and 7f (see Fig. 3) into the cylinders 19; and as pressure is built up in these cylinders by the pump 10 and through the pressure-applying conduit, such pressure tends to move the pistons 28 towards their positions shown in Fig. 1; and this hydraulic pressure cooperates with the elements 13, 33, 31, 32, and 14, as follows:

As the inertia of the load is overcome and permits the elements 33 and 32 to turn the worms 31 in the proper direction to cooperate with the teeth of the worm-gear-wheel 14 for sliding the worms outward along their shafts 32, the pressure between the teeth of the gears or wheels 13 and 33 is balanced with the hydraulic pressure against the pistons 28, and remains balanced so long as there is no variation in the power applied to the driving shaft 12 and no variation in the load attached to the driven shaft 16.

As the fixedly united elements 13 and 33 rotate about the common axis of the shafts 12 and 16, they carry oil from the reservoir 0, so these elements act as means to lubricate themselves and all other elements in the stationary casing or chamber 23.

Hydraulic control is started at will of the operator who moves the accelerator so as to adjust the valve port 7o, to the position shown in Figure 4, so some of the oil pressure passes through the conduit sections 7x, 7a, 7b, 7c, 7d, 7e and 7f into the cylinder or pressure chamber 19, and there it begins to exert pressure against each piston 28, so the latter presses against the pivot 29 and bearing sleeve 30 and moves the worm 31 along the axle 32 on which it is slidably and non-rotatably seated, so, now the teeth of the worm 31 begin to bear against the teeth of the worm gear wheel 14; and this action causes the driving element 5 to exert a torque on the driven element 6, via the worm gear wheel 14, the worm 31 and the hydraulic pressure in the cylinder 19. The extent of this torque transmission is determined by the amount of pressure in the hydraulic cylinder 19 which in turn is determined by the speed of the prime mover and consequent speed of the pressure-supplying pump 10. Thus if there is too great a torque on the driven unit which tends to slow down the prime mover considerably, the hydraulic pressure is correspondingly reduced allowing the transmission to adjust its ratio between the driving and driven shafts, to a point where the prime mover will continue turning at a satisfactory speed and still apply a torque on the driven shaft to overcome the torque of starting the vehicle or the variations in torque in operating the vehicle.

Therefore, the load is carried on or against the yieldable cushions provided by the pump 10 supplying hydraulic pressure of oil supplied through the conduit 7 and its branches or elements 7a, 7b, 7c, 7d, 7e to the sections or elements 7f which latter apply the oil-pressure into the cylinders or piston-sockets 19. The extent or degree of yieldingness depends not only on the inherent yieldability of the oil, but also on the adjusted position of the valve port, or opening 7o, also upon the speed of the pump which is determined by the speed of the prime mover and also the slippage of the pump. If the control valve 26 is adjusted so that less oil is bypassed, a greater pressure will be built up in the conduit system to the cylinders, thus placing a greater load on the prime mover per revolution.

Though the foregoing description has been confined mainly to describing and explaining only one unit comprising one of each element, 28, 29, 30, 31, 32, and 33, best results in operation and durability are obtained by the use of three of said units, each being of the same construction, each including a worm 31 engaged with the common worm gear wheel 14 in the same manner and each including a pinion 33 engaged with the teeth 13t in the same manner. Under normal steady loads, the driving and driven shafts rotate at the same speed and all parts are related substantially as shown in Fig. 2; but if the load on shaft 16 is increased suddenly, this sudden increase momentarily retards the shaft 16 and its adjuncts 18, 31, 32 and 33 in their rotation about the axis of shaft 16, without correspondingly retarding the rotation of shaft 12 and its integral adjuncts 13 and 14; so the gear-teeth 13t turn the wheels or pinions 33 in the direction of the arrow (at upper part of Fig. 1) thereby turning the frame 18 and all elements carried thereby in the proper direction, with respect to the worm-gear-wheel 14, to cause the hydraulic cushions in the cylinders 19 to press outward against the pistons 28 while the latter are held against outward movement by the engagement of the worms 31 with the teeth of the worm-gear-wheel 14 that are stable with respect to the driving shaft 12 and forwardly moving with respect to the worms 31 and pistons 28. As the inward motion of the pistons 28 is resisted and halted by the hydraulic cushions, the resistance is communicated to the driving elements 12 and 13, and the reaction of the hydraulic cushions moves the pistons 28 outward along the axles 32 as the latter and the pinions 33 turn slightly forward, with relation to the gear-teeth 13t, until the rotary speeds of the driving and driven mechanisms become equalized, or compensated with respect to the increased load. A similar shock-absorbing and compensation result is accomplished when the speed of the prime-mover and driving shaft 12 is increased suddenly, for then the hydraulic cushions and gear-mechanisms compensate for the inertia of the load. However, under normal conditions, when the speed of the prime-mover and load on the driven shaft are substantially constant or unchanging, the driving and driven units rotate at the same speed as if fixedly united to one another. Any tendency for the worm gear to drive the worm will be counteracted by the counter torque created where the pinion teeth meet the ring gear teeth by the forcing of the worm against the pinion end of its stroke.

Although I have described this embodiment of my invention quite specifically, I do not intend to limit my patent protection to the precise details of description in the foregoing, for the invention is subject to numerous changes within the scope of inventive ideas as applied and claimed. Moreover, the result would be substantially the same if the power were applied to the shaft 16 and the load applied to the shaft 12, in which case it would be only necessary to change the direction of rotation of the driving shaft 12. Also this transmission is not limited to hydraulic control, as it could be controlled pneumatically, or to a lesser degree by spring pressure in the piston sockets.

This invention is claimed as follows:

1. In a machine element, the combination of a driving unit including a driving shaft and a ring-gear-wheel and a worm-gear-wheel fixedly united and being journaled for rotation, a driven unit including a driven shaft journaled for rotation in axially alined relation to said driving shaft and a hydraulic controlling means that includes a pump which is operatively connected to said driving unit for operation by the latter, said driven unit comprising bearing-portions each having a piston-socket therein, said hydraulic controlling means including a pressure-applying conduit having one end in open communication with said pump and its other end in open communication with said piston socket; said driven unit comprising a piston slidably engaged with said socket, an axially apertured worm having an axial end journaled in said piston, an axle journaled in one of said bearing portions, and a pinion united with one end of said axle, the other end of said axle being slidably fitted in the axial aperture of said worm so the worm will be non-rotatable with respect to said axle, but movable longitudinally on said axle; said worm-gear-wheel being operatively engaged with said worm for moving the worm and piston against hydraulic pressure in said piston socket, and said ring-gear being provided with teeth interengaged with the teeth of said pinion.

2. In a machine element the combination of a bearing frame, a driving unit including a driving shaft and a ring-gear-wheel and a worm-gear-wheel fixedly united and being journaled for rotation in said bearing frame, a driven shaft journaled for rotation in said bearing frame in axially-alined relation to said driving shaft, the driven shaft being a part of a driven unit; and a hydraulic controlling means that includes an oil-supplying pump that is operatively connected to the bearing frame and to an oil-supplying source and to said driving unit for operation by the latter, and said driven unit comprising bearing portions, each bearing-portion having a piston socket therein, said hydraulic controlling means including a pressure-applying conduit having one end in open communication with said pump and its other end in open communication with said piston-socket; said driven unit comprising a piston slidably engaged in said socket, an axially apertured worm having an axial end journaled in said piston, an axle journaled in one of said bearing portions, and a pinion united with one end of said axle, the other end of said axle being slidably fitted in the axial aperture of said worm so as to be non-rotatable with respect to said axle but movable longitudinally on said axle; said ring-gear-wheel having a rim provided with teeth interengaged with the teeth of the said pinion, and said driving unit comprising a worm gear operatively engaged with said worm for moving the worm and piston against hydraulic pressure in said socket.

3. The combination defined in claim 1, and a liquid container in open communication with said pump for supplying said fluid to said pump, and a liquid-conducting bypass in open communication with said pump and provided with means to put it into and out of operation or open communication with said pump and said pressure-applying conduit.

4. The combination defined by claim 1, supply means for supplying hydraulic fluid to said pump, said pressure-applying conduit comprising a valve in open communication with said pump's outlet and provided with actuating means for moving it from conduit opening position to conduit closing position, and fluid returning means in open communication with said valve and with said supply means, and said valve having an outlet port that is wide enough and properly located to be in open communication with said fluid returning means and with an adjacent port of said pressure applying conduit.

5. The combination defined by claim 1, said pressure-applying conduit comprising a support-bearing around said driven shaft and having a peripheral channel around its inner surface, said pressure applying conduit also comprising a radially disposed port in open communication with said peripheral channel.

6. In the combination defined in claim 1, the speed ratio between the said worm-gear-wheel and the said worm being primarily substantially equal to the speed ratio between the said pinion and said ring-gear-wheel.

7. In the combination defined by claim 1, said axle being disposed tangentially with respect to a theoretic circle parallel to said rim, and teeth of said ring-gear-wheel and said pinion being constructed hypoidally so as to provide accurate meshing of said ring-gear-wheel and said pinion.

8. In the combination defined by claim 2, said oil-supply source being a basin in said bearing frame and being a means to supply lubrication to said driving and driven unit while also supplying oil as a hydraulic liquid to said piston socket.

9. The combination defined by claim 1, a liquid container normally in open communication with said pump for supplying hydraulic liquid to said pump, said pump being in open communication with said conduit and operable to supply said liquid under pressure to said pressure-applying conduit and through said conduit to said piston-socket, said pressure-applying conduit comprising a two-way valve, a bypass normally in open communication with said liquid container and with said two-way valve while said pressure-applying conduit is also open through said valve, and means to adjust said valve to proper positions for alternately increasing or decreasing the flow and pressure through said by-pass through said pressure-applying conduit.

HOWARD L. GATES.

REFERENCES CITED

The following references are of record in the file of this patent:

UNITED STATES PATENTS

| Number | Name | Date |
|---|---|---|
| 1,611,630 | Burke | Dec. 21, 1926 |
| 1,904,319 | Marolf | Apr. 18, 1933 |

FOREIGN PATENTS

| Number | Country | Date |
|---|---|---|
| 352,687 | Great Britain | July 16, 1931 |